US010605500B2

(12) United States Patent
Kamiya et al.

(10) Patent No.: US 10,605,500 B2
(45) Date of Patent: Mar. 31, 2020

(54) HEAT PUMP DEVICE, AIR CONDITIONER, AND FREEZER

(75) Inventors: Shota Kamiya, Tokyo (JP); Kazunori Hatakeyama, Tokyo (JP); Kenta Yuasa, Tokyo (JP); Shinya Matsushita, Tokyo (JP); Shinsaku Kusube, Tokyo (JP); Tsutomu Makino, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 187 days.

(21) Appl. No.: 14/366,768

(22) PCT Filed: Jan. 4, 2012

(86) PCT No.: PCT/JP2012/050040
§ 371 (c)(1),
(2), (4) Date: Jun. 19, 2014

(87) PCT Pub. No.: WO2013/102999
PCT Pub. Date: Jul. 11, 2013

(65) Prior Publication Data
US 2014/0338380 A1 Nov. 20, 2014

(51) Int. Cl.
F25B 30/02 (2006.01)
F25B 13/00 (2006.01)
(Continued)

(52) U.S. Cl.
CPC ............. F25B 30/02 (2013.01); F25B 13/00 (2013.01); H02P 1/00 (2013.01); H02P 29/62 (2016.02);
(Continued)

(58) Field of Classification Search
CPC .. F25B 49/025; F25B 30/02; F25B 2600/021; F25B 2500/19; F25B 2500/16;
(Continued)

(56) References Cited

U.S. PATENT DOCUMENTS 5,012,652 A * 5/1991 Dudley .................. F04B 39/00
62/192
5,230,222 A * 7/1993 Erbs ...................... F25B 31/002
62/192

(Continued)

FOREIGN PATENT DOCUMENTS

EP 2 259 419 A1 12/2010
JP 60-68341 U 5/1985
(Continued)

OTHER PUBLICATIONS

Chinese Office Action dated Jun. 17, 2015 in the corresponding CN application No. 201280066022.7(English translation attached).
(Continued)

Primary Examiner — Christopher S Bobish
(74) Attorney, Agent, or Firm — Posz Law Group, PLC

(57) ABSTRACT

A heat pump device includes a compressor including a motor, a heat exchanger, an inverter, and an inverter control unit. The inverter control unit generates a drive signal for the inverter. When the compressor is heated, the inverter control unit applies, to the motor, a high-frequency voltage with which the motor cannot be rotationally driven; estimates a magnetic pole position indicating a stop position of a rotor of the motor; determines an amplitude and a phase of a voltage command based on an estimation result of the magnetic pole position and a necessary amount of heat, and generates a drive signal.

13 Claims, 10 Drawing Sheets

(51) Int. Cl.
*H02P 29/62* (2016.01)
*H02P 1/00* (2006.01)

(52) U.S. Cl.
CPC .... *F04C 2240/403* (2013.01); *F04C 2270/10* (2013.01); *F04C 2270/195* (2013.01); *F04C 2270/701* (2013.01); *F25B 2500/16* (2013.01); *F25B 2500/19* (2013.01); *F25B 2600/021* (2013.01); *F25B 2600/024* (2013.01); *F25B 2600/0253* (2013.01); *F25B 2700/151* (2013.01); *F25B 2700/21156* (2013.01)

(58) Field of Classification Search
CPC ...... F25B 2700/151; F25B 2700/21156; F25B 2600/024; Y02B 30/741; F04C 2240/403; F04C 2270/10; F04C 2270/701; F04C 2270/195; F04C 2270/00; H02P 1/00
USPC .................. 62/228.1; 318/400.11; 417/410.1
See application file for complete search history.

(56) References Cited

U.S. PATENT DOCUMENTS

| | | | | |
|---|---|---|---|---|
| 6,901,212 | B2* | 5/2005 | Masino | H02P 6/12 318/400.13 |
| 8,011,198 | B2* | 9/2011 | Ishikawa | F04B 49/06 318/436 |
| 8,734,125 | B2* | 5/2014 | McSweeney | F04B 35/04 417/228 |
| 9,291,379 | B2* | 3/2016 | Sakai | F04B 39/121 |
| 2001/0035018 | A1* | 11/2001 | Takagi | F25B 49/025 62/228.4 |
| 2002/0021098 | A1* | 2/2002 | Matsushiro | H02P 6/085 318/400.11 |
| 2003/0141833 | A1* | 7/2003 | Heidrich | H02P 6/182 318/400.13 |
| 2007/0132424 | A1 | 6/2007 | Takao et al. | |
| 2008/0246431 | A1* | 10/2008 | Koji | F04B 49/06 318/801 |
| 2008/0297082 | A1* | 12/2008 | Kurosawa | H02P 1/46 318/400.11 |
| 2010/0011788 | A1* | 1/2010 | Lifson | F25B 31/002 62/115 |
| 2010/0278660 | A1* | 11/2010 | Burchill | F04B 49/02 417/53 |
| 2010/0328975 | A1 | 12/2010 | Hibino et al. | |
| 2011/0083450 | A1* | 4/2011 | Turner | F25B 31/004 62/56 |
| 2011/0083467 | A1 | 4/2011 | Asano et al. | |
| 2011/0256005 | A1* | 10/2011 | Takeoka | H02P 6/18 417/415 |
| 2012/0111043 | A1 | 5/2012 | Hatakeyama et al. | |
| 2013/0152609 | A1 | 6/2013 | Hatakeyama et al. | |
| 2013/0180273 | A1 | 7/2013 | Hatakeyama et al. | |
| 2013/0291578 | A1 | 11/2013 | Hatakeyama et al. | |

FOREIGN PATENT DOCUMENTS

| | | |
|---|---|---|
| JP | 61-091445 A | 5/1986 |
| JP | 08-226714 A | 9/1996 |
| JP | 11-159467 A | 6/1999 |
| JP | 11-324934 A | 11/1999 |
| JP | 2002-136175 A | 5/2002 |
| JP | 2005-261138 A | 9/2005 |
| JP | 2007-159334 A | 6/2007 |
| JP | 2007-166766 A | 6/2007 |
| JP | 2009-153355 A | 7/2009 |
| JP | 2009-219268 A | 9/2009 |
| JP | 2009-293907 A | 12/2009 |
| JP | 2010-028981 A | 2/2010 |
| JP | 2011-002190 A | 1/2011 |
| JP | 2011-038689 A | 2/2011 |
| JP | 2011-144966 A | 7/2011 |
| WO | 2012/029099 A1 | 3/2012 |
| WO | 2012/049763 A1 | 4/2012 |
| WO | 2012/086010 A1 | 6/2012 |

OTHER PUBLICATIONS

Office Action dated Sep. 2, 2014 issued in corresponding JP patent application No. 2013-552361 (and English translation).
International Search Report of the International Searching Authority dated Feb. 28, 2012 for the corresponding international application No. PCT/JP2012/050040 (and English translation).
Extended European Search Report dated Sep. 29, 2016 issued in corresponding EP patent application No. 12864036.4.
Office Action dated Feb. 3, 2020 issued in corresponding EP patent application No. 12864036.4.

* cited by examiner

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | -U | 0 | 1 | 1 | 1 | 0 | 0 |
| V4 | +U | 1 | 0 | 0 | 0 | 1 | 1 |
| V5 | -V | 1 | 0 | 1 | 0 | 1 | 0 |
| V6 | -W | 1 | 1 | 0 | 0 | 0 | 1 |
| V7 | 0 | 1 | 1 | 1 | 0 | 0 | 0 |

HEAT PUMP DEVICE, AIR CONDITIONER, AND FREEZER

CROSS REFERENCE TO RELATED APPLICATION

This application is a U.S. national stage application of PCT/JP2012/050040 filed on Jan. 4, 2012, the contents of which are incorporated herein by reference.

TECHNICAL FIELD

The present invention relates to a heat pump device that uses a compressor and particularly to a heat pump device that is used in an air conditioner, a freezer, a water heater, and the like.

BACKGROUND

Heat pump devices exist that supply a high-frequency low voltage to a compressor during a shutdown during heating in order to improve the rising speed of the air conditioner when heating is started (for example, see Patent Literature 1). A similar technique is used in a heat pump device that supplies a single-phase AC voltage having a higher frequency than that at the time of a normal operation to a compressor when it is detected that the temperature of the air conditioner's surroundings becomes low (for example, see Patent Literature 2).

Moreover, in order to prevent the refrigerant retention phenomenon from occurring, a heat pump device exists that generates, as drive signals for a compressor motor, signals to be output with a predetermined static phase angle in the PWM output in a two-phase modulation system during the restricted energization for preheating the compressor (for example, see Patent Literature 3).

Patent Literature

Patent Literature 1: Japanese Unexamined Utility Model Registration Application Publication No. S60-68341

Patent Literature 2: Japanese Patent Application Laid-Open No. S61-91445

Patent Literature 3: Japanese Patent Application Laid-Open No. 2007-166766

The above Patent Literatures 1 and 2 disclose a technique facilitating a lubricating action in the compressor by heating the compressor or keeping the compressor warm by applying a high-frequency AC voltage to the compressor in response to a decrease in outside air temperature.

However, there is no detailed description in Patent Literature 1 of the high-frequency low voltage, and the output change, which depends on the stop position of the rotor, is not taken into consideration. Therefore, there is a problem in that the desired amount of heat for the compressor may not be obtained.

In contrast, there is a description in the above Patent Literature 2 of an application of a voltage from a high-frequency (e.g., 25 kHz) single-phase AC power supply and the effects, such as noise reduction due to being outside the audible range, vibration suppression due to not being the resonance frequency, input reduction and prevention of temperature increase due to the reduction in current by the amount of inductance in the winding, and rotation suppression of the rotating part of the compressor.

However, in the technique in Patent Literature 2, because a high-frequency single-phase AC power supply is used, a fully-off period, during which all the switching elements are off, is generated for a relatively long time as shown in FIG. 3 in Patent Literature 2. At this point, a high-frequency current is regenerated to the DC power supply without it flowing back to the motor via the freewheeling diodes and the current decays fast during the off-period; therefore, there is a problem in that a high-frequency current does not efficiently flow to the motor and thus the heating efficiency of the compressor degrades. Moreover, when a small motor having low iron loss is used, the amount of heat generation becomes small with respect to the applied voltage; therefore, there is a problem in that the necessary amount of heat cannot be obtained with a voltage that is within the usable range.

Moreover, Patent Literature 3 discloses a technique of performing preheating such that the rotor does not rotate by performing restricted energization in which a DC current is caused to flow in the motor winding.

However, the winding resistance of a motor tends to decrease due to the highly efficient design of recent motors. Therefore, in the case of the preheating method of causing a DC current to flow in the motor winding as described in Patent Literature 3, because the amount of heat generation is given by the product of the winding resistance and the square of the current, the current is increased by the amount of reduction of the winding resistance. Consequently, a problem arises with the heat generation due to the increase of the inverter loss and also other problems arise such as a decrease in reliability and an increase in the cost of heat dissipation structures.

SUMMARY

The present invention has been achieved in view of the above and an object of the present invention is to obtain a heat pump device, an air conditioner, and a freezer capable of stably heating a compressor regardless of the stop position of a rotor of a motor.

Moreover, an object of the present invention is to obtain a heat pump device, an air conditioner, and a freezer capable of efficiently realizing a necessary heat output.

In order to solve the above problems and achieve the object, the present invention is a heat pump device that includes a compressor including a compression mechanism that compresses a refrigerant and a motor that drives the compression mechanism, a heat exchanger, an inverter that applies a desired voltage to the motor, and an inverter control unit including a drive-signal generation unit that generates a drive signal for the inverter and a heating-operation-mode control unit that controls the drive-signal generation unit when the compressor is heated by applying, to the motor, a high-frequency voltage with which the motor is not capable of being rotationally driven, wherein the heating-operation-mode control unit includes a magnetic-pole-position estimation unit that estimates a magnetic pole position, which indicates a stop position of a rotor of the motor, on a basis of an induced voltage of the motor, and an amplitude and phase determination unit that determines an amplitude and a phase of a voltage command expressed by a sine wave on a basis of an estimation result of the magnetic pole position and a prespecified necessary amount of heat, notifies the drive-signal generation unit of determined amplitude and phase, and causes the drive-signal generation unit to generate a drive signal according to a notification content.

According to the heat pump device in the present invention, effects are obtained in that the refrigerant retention phenomenon can be avoided by stably heating the compressor regardless of the stop position of the rotor of the motor and energy can be saved.

DETAILED DESCRIPTION

Exemplary embodiments of a heat pump device, an air conditioner, and a freezer according to the present invention will be explained below in detail with reference to the drawings. This invention is not limited to the embodiments.

First Embodiment

Figure 1:
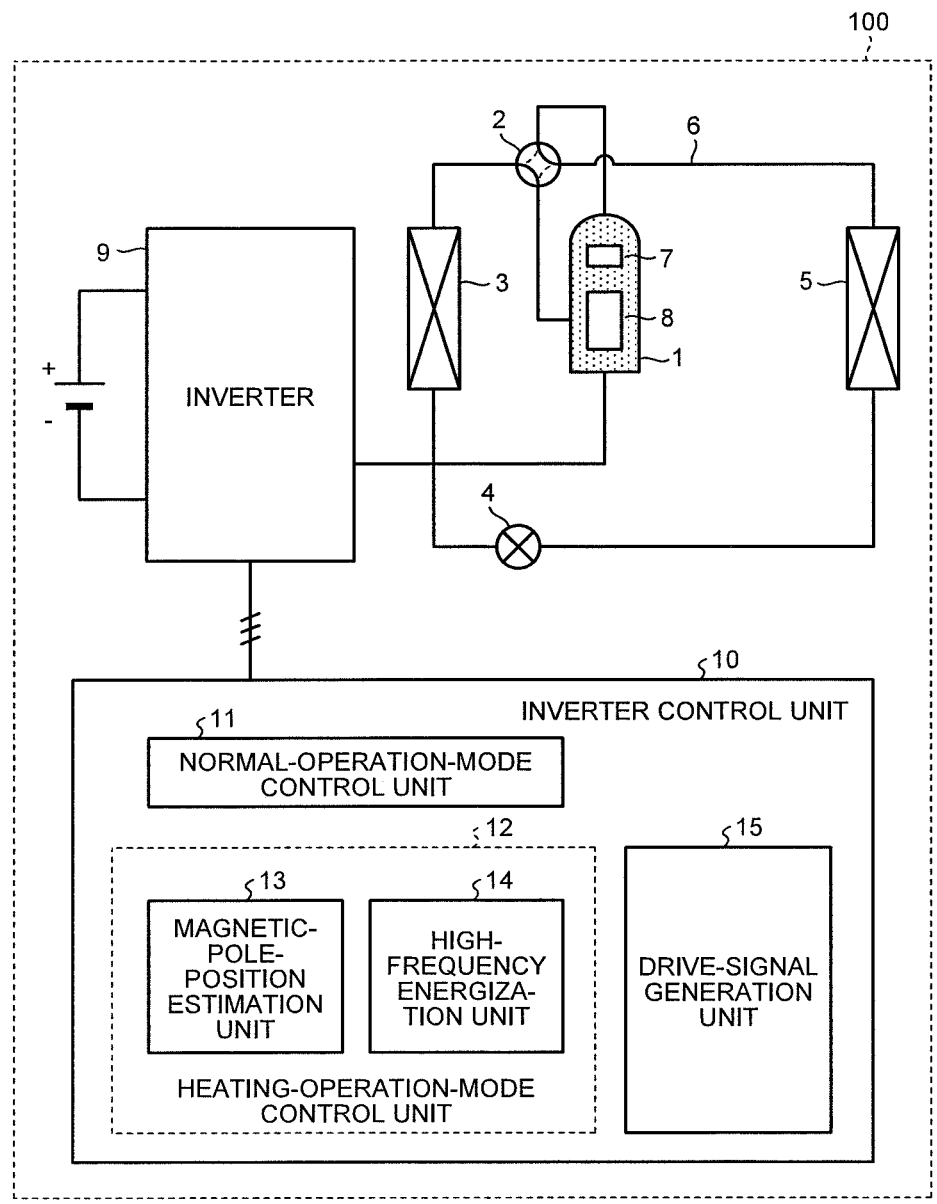
FIG. 1 is a diagram showing a configuration example of a first embodiment of a heat pump device according to the present invention.

FIG. 1 is a diagram showing a configuration example of a first embodiment of a heat pump device according to the present invention. A heat pump device 100 according to the present embodiment is configured, for example, as an air conditioner and includes a refrigeration cycle in which a compressor 1, a four-way valve 2, a heat exchanger 3, an expansion mechanism 4, and a heat exchanger 5 are sequentially connected via a refrigerant pipe 6. A compression mechanism 7, which compresses a refrigerant, and a motor 8, which actuates the compression mechanism 7, are provided in the compressor 1. The motor 8 is a three-phase motor including windings of three phases, i.e., U-phase, V-phase, and W-phase.

An inverter 9 that applies a voltage to the motor 8 to drive the motor 8 is electrically connected to the motor 8. The inverter 9 uses a DC voltage (bus voltage) Vdc as a power supply and applies voltages Vu, Vv, and Vw to the U-phase, V-phase, and W-phase windings of the motor 8, respectively. The inverter 9 is electrically connected to an inverter control unit 10. The inverter control unit 10 includes a normal-operation-mode control unit 11, a heating-operation-mode control unit 12, which includes a magnetic-pole-position estimation unit 13 and a high-frequency energization unit 14, and a drive-signal generation unit 15, and outputs signals (e.g., PWM signals) for driving the inverter 9 to the inverter 9.

In the inverter control unit 10, the normal-operation-mode control unit 11 is used when the heat pump device 100 performs a normal operation. The normal-operation-mode control unit 11 controls the drive-signal generation unit 15 such that it outputs, as inverter drive signals, PWM signals for rotationally driving the motor 8.

The heating-operation-mode control unit 12 is used when the compressor 1 is heated. The heating-operation-mode control unit 12 controls the drive-signal generation unit 15 such that it outputs, as inverter drive signals, PWM signals for heating the compressor 1 without rotationally driving the motor 8 by causing a high-frequency current to flow that the motor 8 cannot follow. At this point, the high-frequency energization unit 14 controls the drive-signal generation unit 15 on the basis of the result (estimation information) obtained by estimates made by the magnetic-pole-position estimation unit 13 of the magnetic pole position, which indicates the stop position of the rotor of the motor 8 and the drive-signal generation unit 15 drives the inverter 9 by outputting the PWM signals, thereby heating and evaporating a liquid refrigerant retained in the compressor 1 in a short time and discharging it to the outside of the compressor 1.

Figure 2:
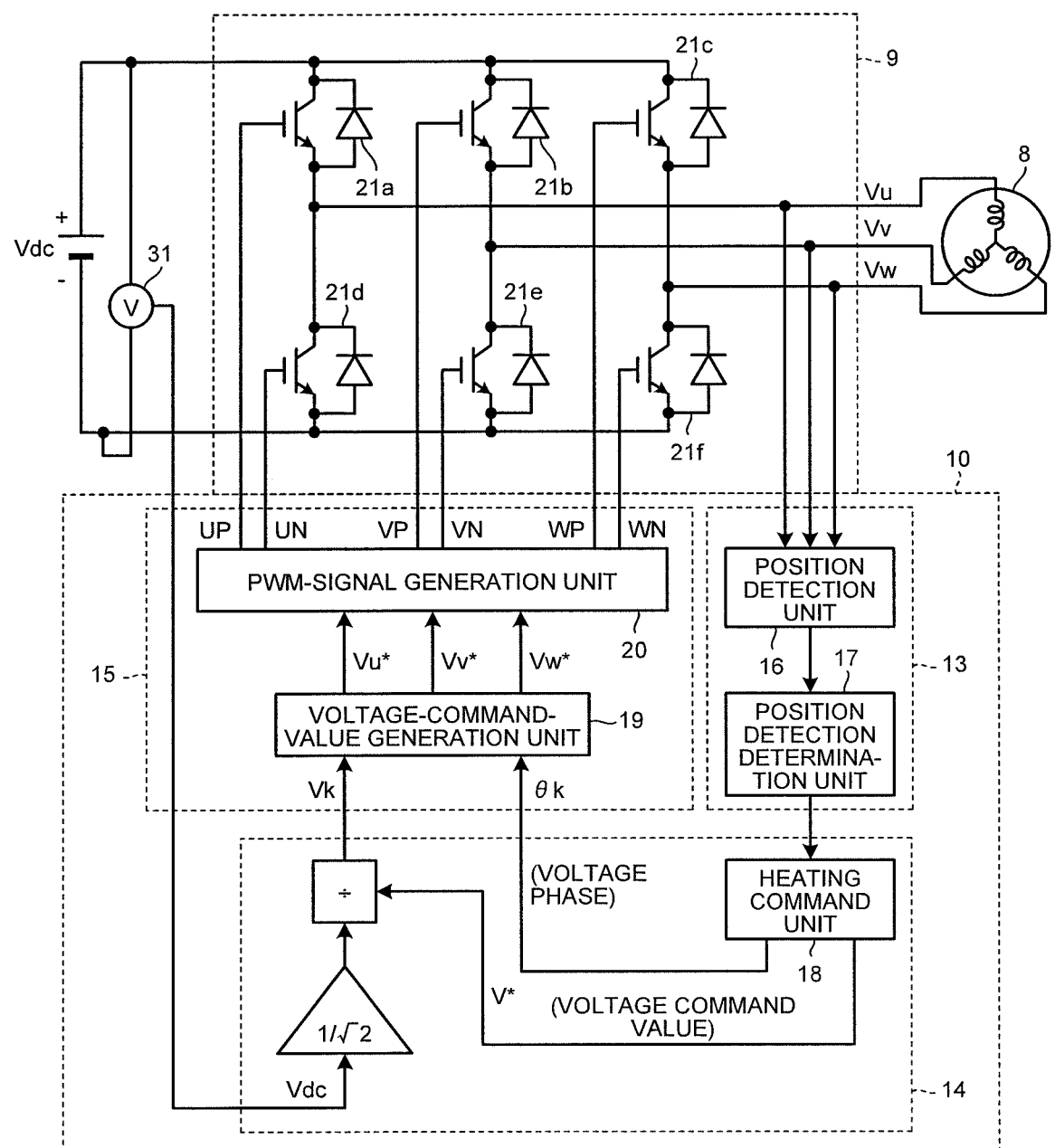
FIG. 2 is a diagram showing an example of a main portion configuration of the heat pump device.

FIG. 2 is a diagram showing an example of the main portion configuration of the heat pump device. As shown in FIG. 2, the inverter 9 is a circuit that uses the bus voltage Vdc as a power supply and in which three series connection portions of six switching elements (21a, 21b, 21c, 21d, 21e, and 21f) are connected in parallel. The inverter 9 drives the switching elements in accordance with respective PWM signals (UP to WN), which are drive signals input from the inverter control unit 10, to generate three-phase voltages Vu, Vv, and Vw and then applies these voltages to the U-phase, V-phase, and W-phase windings of the motor 8, respectively. A voltage sensor 31 to detect Vdc is provided on the input side of the inverter 9 (the side from which the bus voltage Vdc is supplied).

The inverter control unit 10 includes the magnetic-pole-position estimation unit 13 and the high-frequency energization unit 14, from which the heating-operation-mode control unit 12 shown in FIG. 1 is configured, and the drive-signal generation unit 15. The magnetic-pole-position estimation unit 13 includes a position detection unit 16 and a position detection determination unit 17. The high-frequency energization unit 14 includes a heating command unit 18. The drive-signal generation unit 15 includes a voltage-command-value generation unit 19 and a PWM-signal generation unit 20. In FIG. 2, only the components that perform a characteristic operation in the heat pump device in the present embodiment are shown and the normal-operation-mode control unit 11 shown in FIG. 1 is not shown.

The heating-operation-mode control unit 12 (the magnetic-pole-position estimation unit 13 and the high-frequency energization unit 14) generates a high-frequency voltage command Vk and a high-frequency phase command θk. In the drive-signal generation unit 15, the voltage-command-value generation unit 19 generates voltage command values Vu*, Vv*, and Vw* for the respective three phases (U-phase, V-phase, and W-phase) on the basis of the high-frequency voltage command Vk and the high-frequency phase command θk that are input from the heatingoperation-mode control unit 12. The PWM-signal generation unit 20 generates the PWM signals (UP, VP, WP, UN, VN, and WN) on the basis of the three-phase voltage command values Vu*, Vv*, and Vw* and drives the inverter 9, thereby causing the inverter 9 to apply a voltage to the motor 8. At this point, a high-frequency voltage is applied so that the rotor of the motor 8 does not rotate and the compressor 1 (see FIG. 1) that includes the motor 8 is heated. The drive-signal generation unit 15 generates the PWM signals even when the heat pump device is operating in the normal operation mode. In this case, the PWM-signal generating method is similar to that in the case of operating in the heating operation mode. In other words, the only difference is the information (information corresponding to Vk and θk described above) input from the normal-operation-mode control unit 11.

The characteristic operation of the heat pump device according to the first embodiment is explained below in detail.

The magnetic-pole-position estimation unit 13 estimates the magnetic pole position (rotor position), for example, by using the method described in Japanese Patent Application Laid-Open No. 2011-61884. In other words, in the magnetic-pole-position estimation unit 13, the position detection unit 16 compares the induced voltage of the motor 8 with the reference voltage to generate a position detection signal and the position detection determination unit 17 estimates the magnetic pole position of the motor 8 on the basis of the position detection signal output from the position detection unit 16. The estimation result of the magnetic pole position is output to the heating command unit 18 of the high-frequency energization unit 14. The magnetic pole position is estimated at the timing before the heating operation mode is entered. For example, the magnetic pole position is estimated while the motor is in operation (while the rotor is rotating). Alternatively, the magnetic pole position may be estimated after the motor has stopped. In a state where the rotor has completely stopped and the induced voltage is not generated, the inverter 9 applies a high-frequency voltage to the motor 8 and the position can be estimated on the basis of the detection result of the value of the current flowing in the motor. Because this position estimation method is publicly known, an explanation thereof is omitted. Alternatively, the position may be estimated immediately before the rotor stops and the estimated position may be stored. In the present embodiment, the estimation method of the magnetic pole position is not specifically defined. The magnetic pole position may be estimated by any publicly known method.

Figure 3:
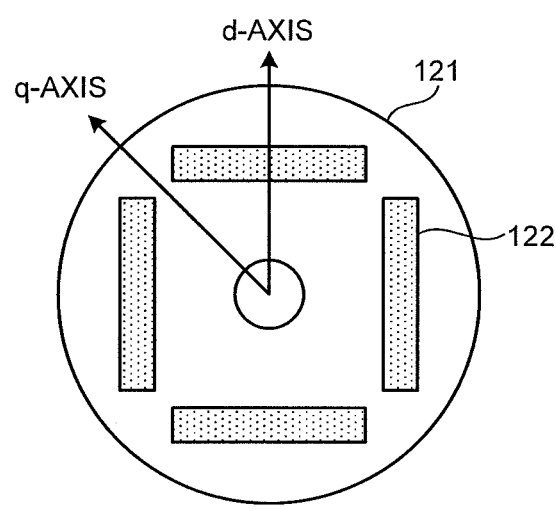
FIG. 3 is a diagram showing the structure of a rotor of an internal permanent magnet synchronous motor.
Figure 4:
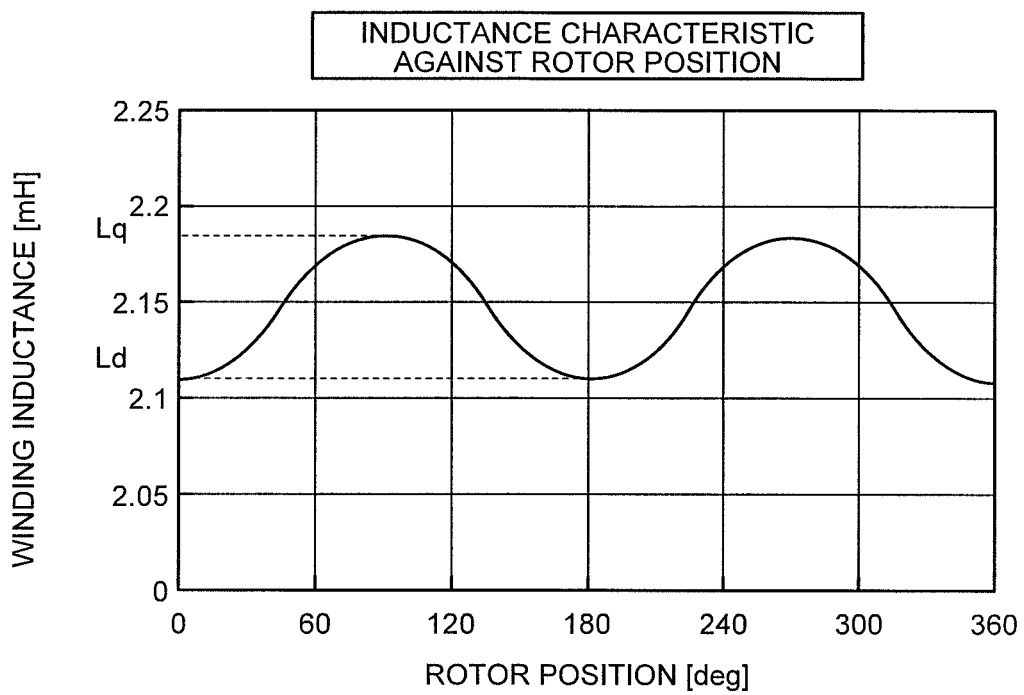
FIG. 4 is a diagram showing an inductance characteristic observed from a stator side of a motor that includes the rotor shown in FIG. 3.
Figure 5:
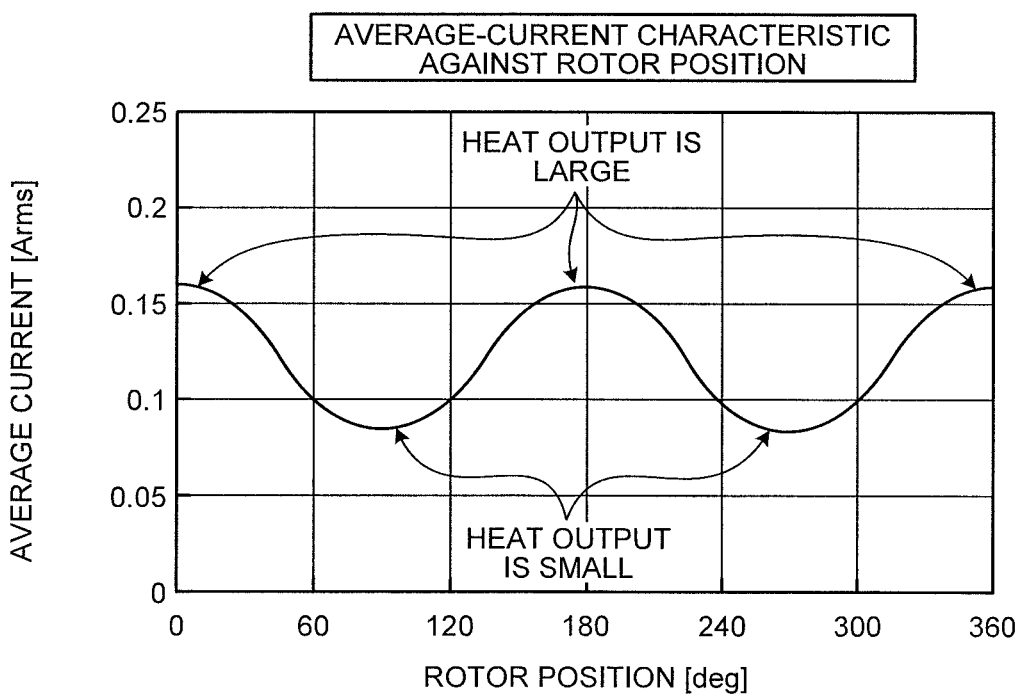
FIG. 5 is a diagram showing a current characteristic corresponding to the inductance characteristic shown in FIG. 4.

In the high-frequency energization unit 14, which operates as an amplitude and phase determination unit, the heating command unit 18 determines the heat output on the basis of the signal (magnetic-pole-position estimation result) from the position detection determination unit 17. FIG. 3 is a diagram showing the structure of the rotor of the internal permanent magnet synchronous motor (corresponding to the motor 8). As shown in FIG. 3, the rotor of the internal permanent magnet synchronous motor is configured to include a core 121 and magnets 122. With such a structure, the length of the air gap (distance between the magnets and the stator) changes depending on the position of the rotor; therefore, the inductance value observed from the stator side changes as shown in FIG. 4. When the inductance value changes as shown in FIG. 4, the amount of current flowing in the winding changes as shown in FIG. 5 and this affects the heat output of the whole device. This indicates that when a high-frequency voltage with a predetermined frequency (fixed value) and a predetermined voltage (fixed value) is applied, the heat output is affected by the fluctuation of the inductance value according to the rotor position and thus it becomes difficult to stably heat the liquid refrigerant. In other words, in order to realize stable heating, it is necessary to adjust the high-frequency voltage to be applied to the motor 8 according to the rotor position.

Therefore, in the heat pump device in the present embodiment, in order to estimate the magnetic pole position indicating the rotor position and obtain the necessary amount of heat generation, the heating command unit 18 generates and outputs the voltage phase θk on the basis of the estimation result of the magnetic pole position, thereby stably heating the compressor 1. Accordingly, even when the inductance value corresponding to the magnetic pole position is high (heat output is small), it is possible to set the voltage phase θk for obtaining the heat output desired by the user. When the inductance value is low (the heat output is large), the current value becomes large and losses, such as iron loss, increase; therefore, when emphasis is on efficiency, it is possible to provide the heating performance desired by the user while realizing an energy saving by adjusting the voltage phase and the voltage command value.

The heating command unit 18 obtains the phase θk for energizing the motor 8 on the basis of the estimation signal (estimation result of the magnetic pole position) from the magnetic-pole-position estimation unit 13 (the position detection determination unit 17). For example, when the winding of the motor 8 corresponding to the position of 0° is energized, θk=0 is output. However, if the winding is continuously energized at a fixed value, only a specific portion of the motor 8 may generate heat; therefore, θk may be caused to change over time. Accordingly, the winding to be energized is changed and thus the motor 8 can be heated uniformly. As shown in FIG. 4, because the inductance value becomes the same at two or more rotor positions, for example, when energization is performed at the position at which the inductance value becomes a minimum, it is satisfactory to alternately energize the windings at the positions 0° and 180°.

As described above, if the magnetic pole position can be estimated, it is possible to obtain a higher output current even with the same applied voltage by energizing the winding corresponding to the magnetic pole position at which the inductance value is low. When the necessary amount of heat is large, the position at which the inductance value is low is estimated on the basis of the estimated magnetic pole position and the winding according to the estimation result is energized, whereby the liquid refrigerant in the compressor 1 can be surely discharged and thus the reliability of the device is improved. When the necessary amount of heat is low, the winding at the magnetic pole position at which the inductance value is high is energized and heat is output with a low output current, whereby the amount of current flowing in the circuit can be reduced and thus energy is saved.

Moreover, the heating command unit 18 outputs a voltage command V* necessary for heat generation on the basis of the necessary amount of heat. It is possible to obtain the voltage command V* according to the necessary amount of heat, for example, by prestoring the relationship between the necessary amount of heat and the voltage command V* as table data. The necessary amount of heat is information specified by the user.

The high-frequency energization unit 14 generates the high-frequency voltage command Vk on the basis of the bus voltage Vdc detected by the voltage sensor 31 and the voltage command V* input from the heating command unit

18. The high-frequency voltage command Vk is represented by the following equation using the voltage command V* and the bus voltage Vdc:

$$Vk = V^* \sqrt{2}/Vdc$$

The data on the outside air temperature, the temperature of the compressor, the configuration of the compressor, and the like is taken into consideration, and the high-frequency voltage command Vk is corrected on the basis of these data; therefore, it is possible to obtain a more accurate value according to the operating environment and thus the reliability can be improved.

Moreover, the angular frequency ω can be increased by setting the drive frequency of the high-frequency current high. A high angular frequency ω can increase iron loss and thus increase the amount of heat generation; therefore, energy can be saved. If high-frequency energization is performed with a frequency that is within the human audible range, noise is generated due to the electromagnetic sound of the motor 8; therefore, the frequency is set to be outside the audible range (for example, 20 kHz or higher).

In the following, an explanation will be made of an operation of generating the PWM signals as drive signals for the inverter 9 by the drive-signal generation unit 15.

In the drive-signal generation unit 15 that generates the PWM signals, first, the voltage-command-value generation unit 19 generates the voltage command values Vu*, Vv*, and Vw* on the basis of the high-frequency voltage command Vk and the phase command θk.

The motor 8 is a three-phase motor. In the case of a three-phase motor, three phases, i.e., U, V, and W, are generally different from each other by 120° (=2π/3). Therefore, the voltage-command-value generation unit 19 generates, as Vu*, Vv*, and Vw*, the voltage command values of the respective phases by assigning the high-frequency voltage command Vk and the voltage phase θk respectively to V* and θ of the cosine curves (sine curves) having phases different by 2π/3 from each other as shown in Equations (1) to (3) below.

$$Vu^* = V^* \times \cos \theta \quad (1)$$

$$Vv^* = V^* \times \cos(\theta - (2\pi/3)) \quad (2)$$

$$Vw^* = V^* \times \cos(\theta + (2\pi/3)) \quad (3)$$

When the voltage command values Vu*, Vv*, and Vw* are generated by the voltage-command-value generation unit 19, the PWM-signal generation unit 20 compares the voltage command values Vu*, Vv*, and Vw* input from the voltage-command-value generation unit 19 with the carrier signal (reference signal) having an amplitude Vdc/2 at a predetermined frequency to generate the PWM signals UP, VP, WP, UN, VN, and WN on the basis of the relationship of their magnitudes to each other.

In Equations (1) to (3) described above, the voltage command values Vu*, Vv*, and Vw* are obtained using a simple trigonometric function; however, the voltage command values Vu*, Vv*, and Vw* may be obtained using other methods, such as a two-phase modulation, a third-harmonic superposition modulation, and a space vector modulation.

The method of generating the PWM signals by the PWM-signal generation unit 20 is explained in detail here. Because the methods of generating the PWM signals corresponding to the U-phase, V-phase, and W-phase are the same, the method of generating the PWM signals UP and UN of the U-phase is explained here as an example.

Figure 6:
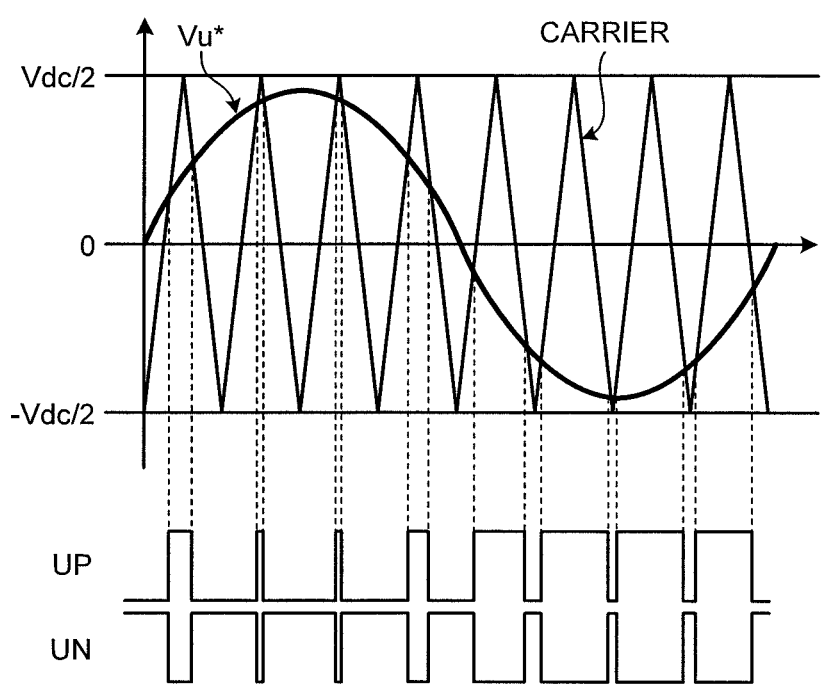
FIG. 6 is a diagram showing a method of generating signals for one phase by a PWM-signal generation unit.

FIG. 6 is a diagram showing the method of generating signals for one phase by the PWM-signal generation unit 20 and shows the method of generating the PWM signals of the U-phase. The triangular wave shown in FIG. 6 indicates the carrier signal and the sine curve shown in FIG. 6 indicates the voltage command value Vu*. The signal generating method shown in FIG. 6 typically corresponds to the method referred to as an asynchronous PWM. The PWM-signal generation unit 20 compares the voltage command value Vu* with the carrier signal having the amplitude Vdc/2 (Vdc indicates a DC bus voltage) at a predetermined frequency and generates the PWM signals UP and UN on the basis of the relationship of their magnitudes to each other. In other words, when the carrier signal is larger than the voltage command value Vu*, the PWM signal UP is on and the PWM signal UN is off and, in other cases, the PWM signal UP is off and the PWM signal UN is on. The amplitude and phase of the carrier signal are fixed.

Figures 7, 8:
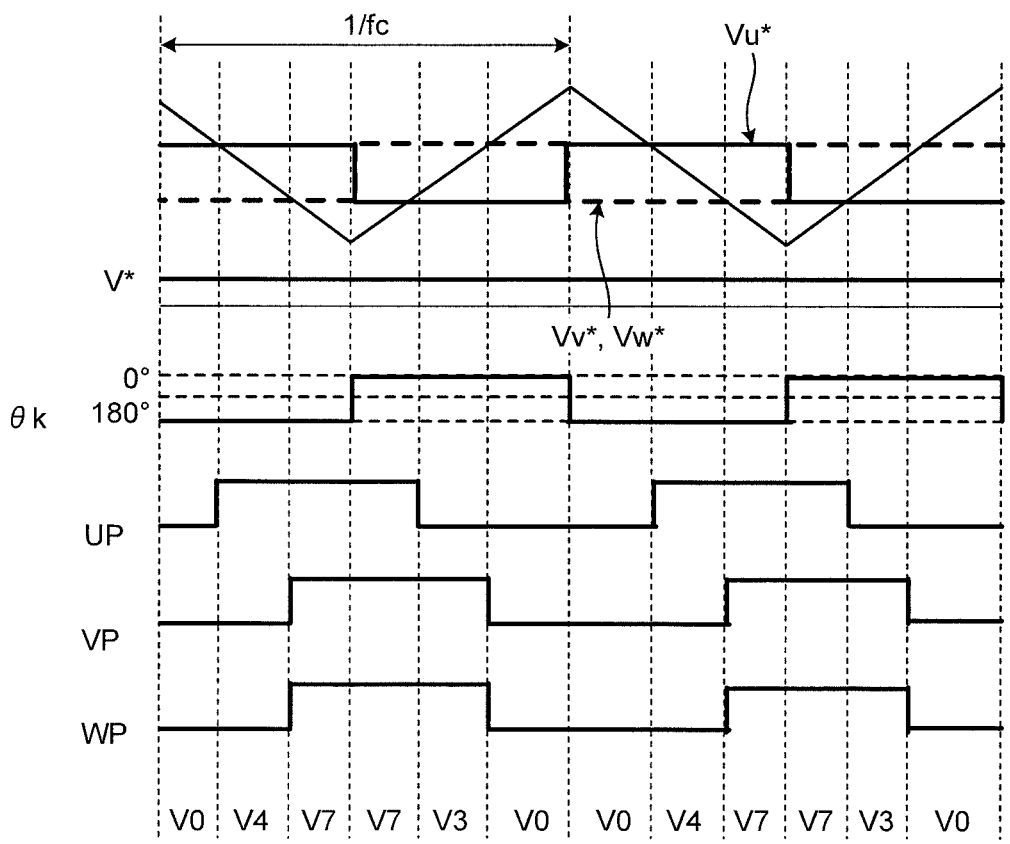
FIG. 7 is a chart showing eight switching patterns of an inverter during a heating operation.
FIG. 8 is a diagram showing an operation of generating PWM signals by the PWM-signal generation unit.

FIG. 7 is a chart showing eight switching patterns in the first embodiment. In FIG. 7, reference symbols V0 to V7 denote voltage vectors generated in the respective switching patterns. The voltage directions of the respective voltage vectors are indicated by ±U, ±V and ±W (and 0 when the voltage is not generated). Here, "+U" means a voltage for generating a current in the U-phase direction, which flows into the motor 8 via the U-phase and flows out from the motor 8 via the V-phase and the W-phase, and "−U" means a voltage for generating a current in the −U phase direction, which flows into the motor 8 via the V-phase and the W-phase and flows out from the motor 8 via the U-phase. The same applies to ±V and ±W.

The inverter 9 can be caused to output desired voltages by combining the switching patterns shown in FIG. 7 and outputting a voltage vector. In the case of an operation (operation in the normal operation mode) in which a refrigerant in the compressor 1 is compressed by the motor 8, the motor 8 is typically operated at a frequency between several tens of Hz and several kHz. At this point, a high-frequency voltage exceeding several kHz can be output by changing θk at high speed and the compressor 1 can be energized and heated (the heating operation mode).

However, in the case of a general inverter, the carrier frequency, which is the frequency of the carrier signal, has an upper limit due to the switching speed of the switching elements of the inverter. Therefore, it is difficult to output a high-frequency voltage having a frequency equal to or higher than the carrier frequency. In the case of a general IGBT (Insulated Gate Bipolar Transistor), the upper limit of the switching speed is about 20 kHz. When the frequency of the high-frequency voltage becomes about 1/10 of the carrier frequency, adverse effects may occur such as deterioration of the waveform output accuracy of the high-frequency voltage and superposition of the DC components. In other words, when the carrier frequency is set to 20 kHz, if the frequency of the high-frequency voltage is set equal to or lower than 2 kHz, which is 1/10 of the carrier frequency, then the frequency of the high-frequency voltage falls within the audio frequency range and therefore noise may increase. Therefore, the PWM-signal generation unit 20 generates the PWM signals synchronized with the carrier signal by the method described below, thereby avoiding an increase in noise.

FIG. 8 is a diagram showing the operation of the PWM-signal generation unit 20 when V* is arbitrary and the output θk of the heating command unit 18 is 0°. The PWM-signal generation unit 20 alternately switches the high-frequency phase command θk between 0° and 180° at the timing when the carrier signal (triangular wave) is at either the top or bottom (or at the timings when the carrier signal is at the top and bottom) and therefore can generate the PWM signals synchronized with the carrier signal. At this point, the voltage vector is changed in order of V0 (UP=VP=WP=0), V4 (UP=1, VP=WP=0), V7 (UP=VP=WP=1), V3 (UP=0, VP=WP=1), V0 (UP=VP=WP=0), and so on.

Figure 9:
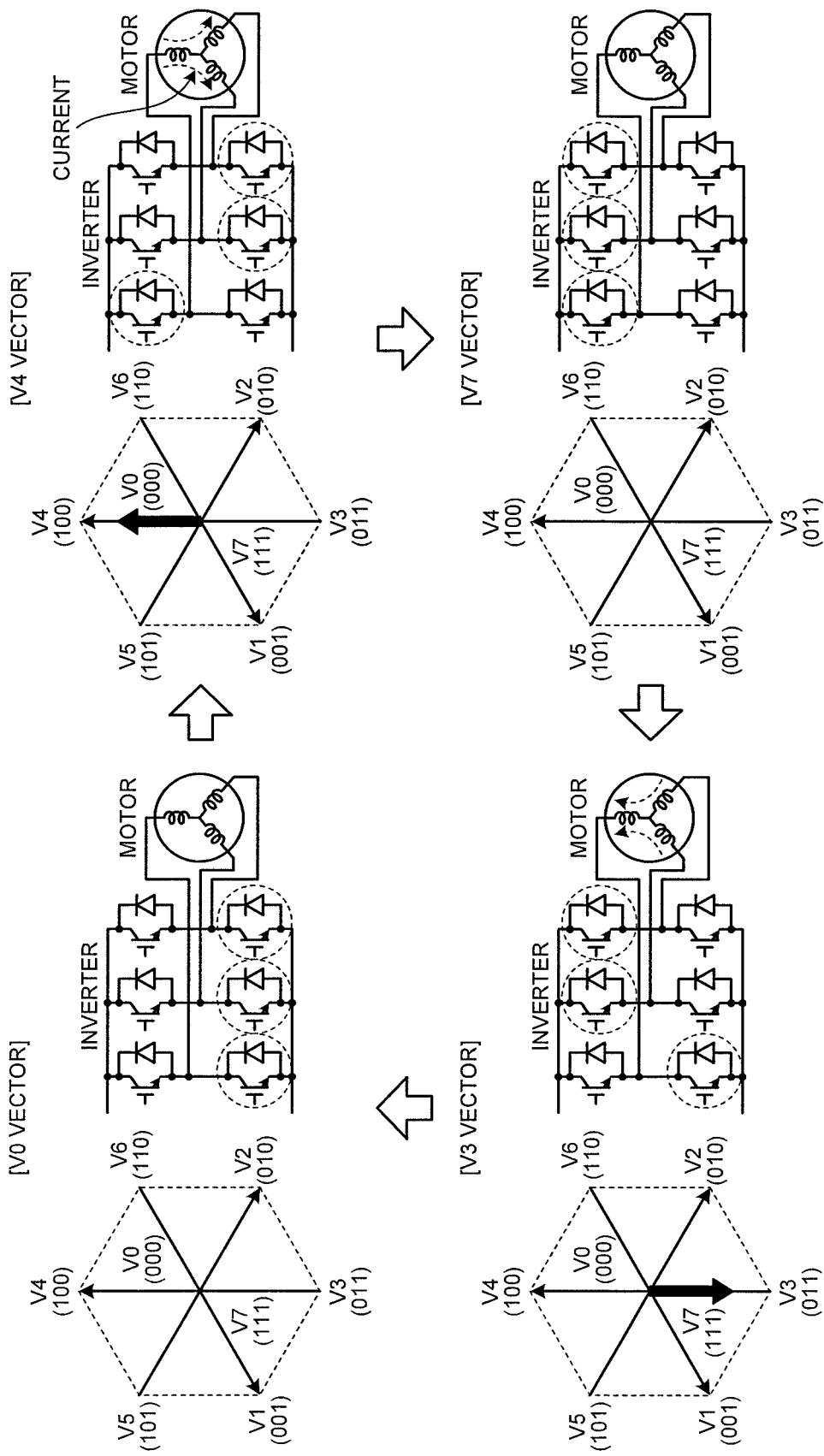
FIG. 9 is an explanatory diagram of a change of a voltage vector corresponding to the operation shown in FIG. 8.

FIG. 9 is an explanatory diagram of a change of the voltage vector corresponding to the operation shown in FIG. 8. FIG. 9 indicates that the switching elements surrounded by broken lines are on and the switching elements not surrounded by broken lines are off. As shown in FIG. 9, when the V0 vector or the V7 vector is applied, the lines of the motor 8 are short-circuited and any voltage is not output. In this case, the energy accumulated in the inductance of the motor 8 becomes a current and the current flows in the short circuit. When the V4 vector is applied, a current (current of +Iu) in the U-phase direction, which flows into the motor 8 via the U-phase and flows out from the motor 8 via the V-phase and the W-phase, flows, and when the V3 vector is applied, a current (current of −Iu) in the −U phase direction, which flows into the motor 8 via the V-phase and the W-phase and flows out from the motor 8 via the U-phase, flows to the windings of the motor 8. In other words, when the V4 vector is applied, the current flows to the windings of the motor 8 in the opposite direction to the case when the V3 vector is applied. Because the voltage vector changes in order of V0, V4, V7, V3, V0, and so on, the current of +Iu and the current of −Iu flow to the windings of the motor 8 alternately. Particularly, as shown in FIG. 8, the V4 vector and the V3 vector appear during one carrier cycle (1/fc); therefore, an AC voltage synchronized with the carrier frequency fc can be applied to the windings of the motor 8. Because the V4 vector (current of +Iu) and the V3 vector (current of −Iu) are alternately output, forward and reverse torques are switched instantaneously. Thus, the torques are canceled; therefore, control can be performed such that vibrations of the rotor are suppressed.

Next, the operation of the inverter control unit 10 is explained. An explanation is made here of the control operation of the inverter 9 when the heat pump device 100 operates in the heating operation mode in which the compressor 1 is heated. The control operation of the inverter 9 when the heat pump device 100 operates in the normal operation mode is similar to that in conventional techniques; therefore, an explanation thereof is omitted.

Figure 10:
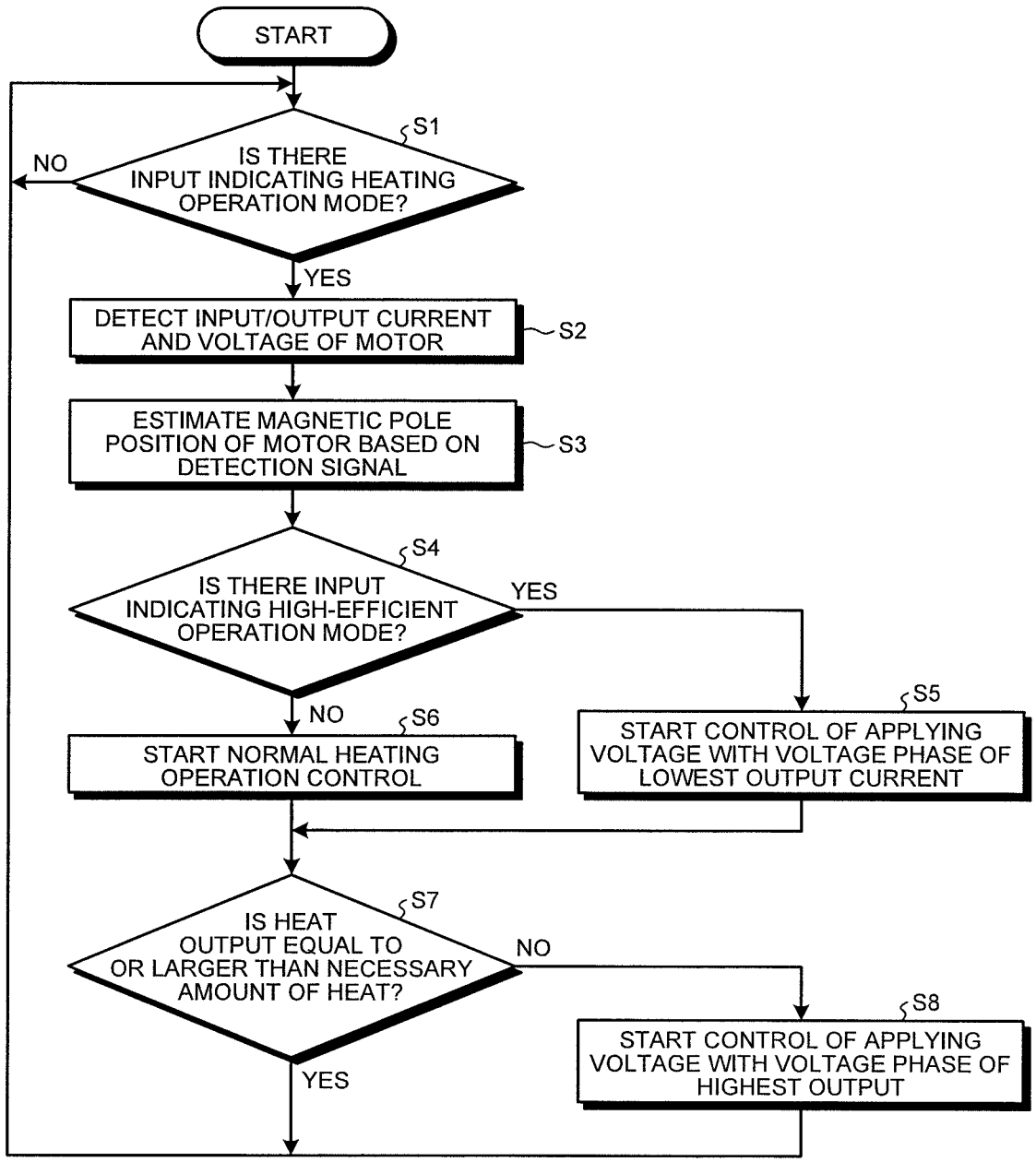
FIG. 10 is a flowchart showing an operation example of an inverter control unit according to the first embodiment.

FIG. 10 is a flowchart showing an operation example of the inverter control unit 10 included in the heat pump device 100 in the first embodiment and shows the control procedure at the time of the heating operation mode. In other words, FIG. 10 shows the control procedure in a case when the heating-operation-mode control unit 12 and the drive-signal generation unit 15 generate the PWM signals as drive signals for the inverter 9.

In the heat pump device 100 in the present embodiment, the inverter control unit 10 first determines whether there is an input indicating the heating operation mode (an input indicating the operation in the heating operation mode) (Step S1). In Step S1, it is possible to determine the need for the operation in the heating operation mode, for example, on the basis of whether the outside air temperature, the temperature of the compressor, or the operation command is input from the outside. For example, when a predetermined operation command (operation start command of the heat pump device 100) is input from the outside and the refrigerant retention phenomenon is expected to occur at this point (for example, when the outside air temperature is equal to or lower than a predetermined threshold), the inverter control unit 10 determines that it is necessary to operate in the heating operation mode. When there is no input indicating the heating operation mode (when it is not necessary to operate in the heating operation mode) (No in Step S1), the inverter control unit 10 performs Step S1 again at a predetermined timing. When there is an input indicating the heating operation mode (Yes in Step S1), the inverter control unit 10 detects the input/output current and voltage of the motor 8 and estimates the magnetic pole position on the basis of the detection signal (Steps S2 and S3). The input/output current and voltage are the current and voltage (for three phases) detected at the connection points of the inverter 9 and the motor 8. The magnetic pole position is estimated by the magnetic-pole-position estimation unit 13 on the basis of, for example, the detection result of the voltage (induced voltage) or the like. In a state where the induced voltage is not generated, the inverter 9 may be controlled such that a high-frequency voltage for estimating the magnetic pole position is applied to the motor 8 and the magnetic pole position may be estimated on the basis of the value of the current flowing in the motor 8 at this point. Moreover, it is also possible to estimate the magnetic pole position on the basis of the induced voltage immediately before the motor 8 stops, prestore the estimation result, and use the estimation result instead of the estimation result in Step S3.

Next, the inverter control unit 10 checks whether there is an input indicating the high-efficient operation mode (whether it is specified to operate in the high-efficient operation mode) (Step S4). When there is an input indicating the high-efficient operation mode (Yes in Step S4), the inverter control unit 10 determines that an operation (high-efficient operation) is performed in the mode in which the output current is suppressed by controlling the voltage phase such that it is at the position at which the inductance value is large. Then, the inverter control unit 10 determines the phase of the voltage command on the basis of the magnetic-pole-position estimation result obtained in Step S3 and starts generation and output of the PWM signals (UP, UN, VP, VN, WP, and WN) corresponding to the high-efficient operation mode to control the inverter 9 (Step S5). Accordingly, the liquid refrigerant retained in the compressor 1 can be heated and evaporated while suppressing the power consumption and can be leaked to the outside of the compressor 1.

When there is no input indicating the high-efficient operation mode (No in Step S4), the inverter control unit 10 starts generation and output of the PWM signals for the heating operation (Step S6). At this point, the inverter control unit 10 does not determine the voltage phase (θk) in consideration of the magnetic-pole-position estimation result (normal heating operation control).

Next, the inverter control unit 10 checks whether the heat output is equal to or larger than the necessary amount of heat, i.e., whether the heat output sufficient for evaporating the liquid refrigerant retained in the compressor 1 is obtained (Step S7). For example, the inverter control unit 10 calculates the heat output on the basis of the input/output current and voltage of the motor 8 and checks whether the calculated heat output is equal to or larger than a predetermined threshold. When the heat output is smaller than the predetermined threshold, the inverter control unit 10 determines that the heat output is insufficient (No in Step S7) and determines that the operation (high power operation) is performed in the mode in which the heat output is maximized by controlling the voltage phase such that it is at the position at which the inductance value is low. Then, the inverter control unit 10 determines the phase of the voltage command on the basis of the magnetic-pole-position estimation result obtained in Step S3 and starts generation and output of the PWM signals (UP, UN, VP, VN, WP, and WN) corresponding to the high power operation (Step S8). As a result, a large amount of high-frequency current flows in the motor 8 and heat is generated due to copper loss and iron loss; therefore the motor 8 can be heated in a short time.

When the heat output is equal to or larger than the predetermined threshold, the inverter control unit 10 determines that the heat output is sufficient (Yes in Step S7) and does not perform Step S8.

After the inverter control unit 10 performs Step S8 or determines that the heat output is sufficient in Step S7, the inverter control unit 10 performs Step S1 again at a predetermined timing (repeatedly performs the operations in Steps S1 to S8 described above). Because the motor 8 is not rotationally driven in the heating operation mode, after the magnetic pole position is once estimated, Step S3 of estimating the magnetic pole position may be omitted.

As described above, in the heat pump device in the present embodiment, the inverter control unit 10 estimates the magnetic pole position of the motor 8 included in the compressor 1, determines the voltage phase on the basis of the estimation result and the necessary amount of heat generation, and generates the PWM signals to control the inverter 9. Accordingly, the compressor 1 can be heated stably regardless of the magnetic pole position of the motor 8. As a result, the liquid refrigerant retained in the compressor 1 leaks to the outside. Moreover, because the current flowing in the motor 8 is adjusted in accordance with the magnetic pole position, the compressor 1 can be efficiently heated and thus energy can be saved.

In addition, because the inverter 9 is controlled such that a high-frequency voltage having a frequency outside the audio frequency range (20 Hz to 20 kHz) is applied to the motor 8, noise when the motor 8 is heated can be suppressed.

Generally, the operation frequency when the compressor is in operation is 1 kHz at most. Therefore, a high-frequency voltage having a frequency equal to or higher than 1 kHz only has to be applied to the motor. When a voltage having a frequency equal to or higher than 14 kHz is applied to the motor 8, the vibration sound of the iron core of the motor 8 approaches nearly the upper limit of the audio frequency range; therefore, noise can be reduced. For example, it is satisfactory to apply a high-frequency voltage of about 20 kHz, which is outside the audio frequency range.

However, when the frequency of the high-frequency voltage exceeds the maximum rated frequency of the switching elements 21a to 21f, load or power supply short-circuit may occur due to the breakage of the switching elements, and this can lead to the generation of smoke or creation of a fire. For this reason, it is desired to set the frequency of the high-frequency voltage to be equal to or lower than the maximum rated frequency, thereby ensuring the reliability.

Second Embodiment

A heat pump device in a second embodiment will be explained. The device configuration is similar to that in the first embodiment (see FIG. 2).

Figure 11:
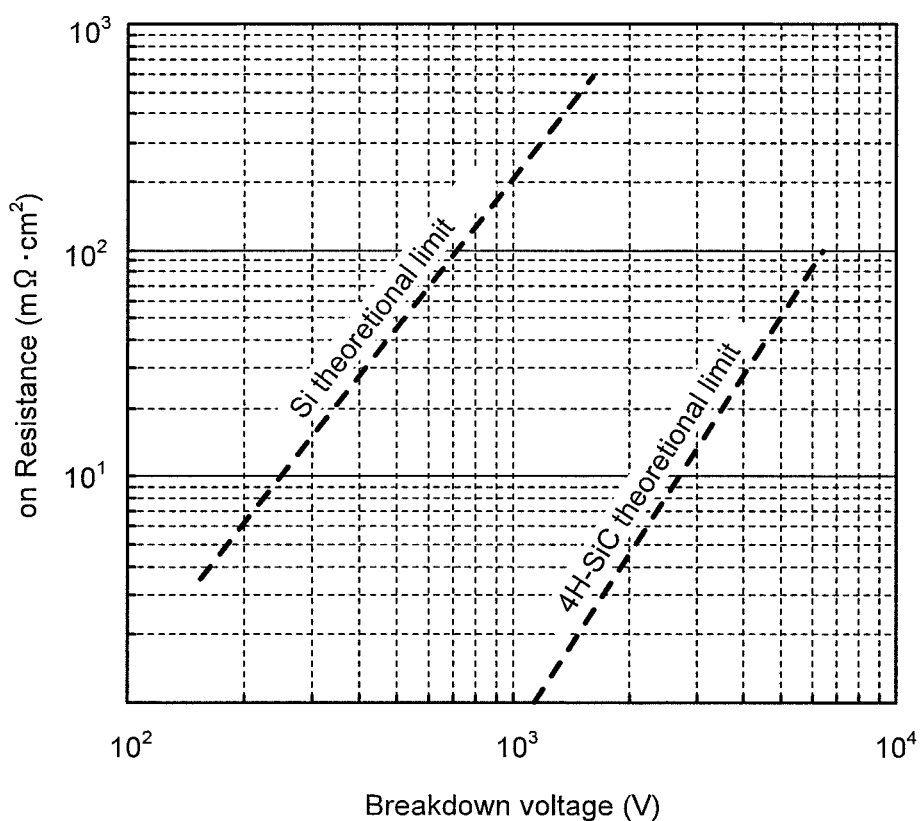
FIG. 11 is a diagram showing the relationship between the breakdown voltage and the on resistance of an Si device and an SiC device.

The heat pump device in the second embodiment is explained with reference to FIG. 11. The heat pump device in the present embodiment is such that the switching elements 21a to 21f shown in FIG. 2 are switching elements formed from silicon carbide devices (hereinafter, SiC devices). Currently, it is typically mainstream to use semiconductors made of silicon (Si). FIG. 11 is a diagram showing the relationship between the breakdown voltage and the on resistance of a silicon device (hereinafter, Si device) and an SiC device. It is known that an SiC device has a larger bandgap than an Si device and can significantly improve the trade-off between the breakdown voltage and the on resistance. For example, a cooling device and a radiator fin are essential for currently used induction heating cookers in which Si devices are used, and the element loss can be significantly reduced by using SiC devices, which are wide bandgap semiconductor devices. Therefore, conventional cooling devices and radiator fins can be reduced in size or eliminated. Wide bandgap semiconductors other than SiC include, for example, a gallium nitride material and diamond.

As described above, the loss can be significantly reduced by changing the switching elements from conventional Si devices to SiC devices; therefore, cooling devices and radiator fins can be reduced in size or eliminated. Accordingly, the cost of the device itself can be significantly reduced. Moreover, switching can be performed at high frequency; therefore, a current with a higher frequency can be caused to flow in the motor 8. Accordingly, the winding current is reduced due to the increase of the winding impedance of the motor 8; therefore, the current flowing in the inverter 9 is reduced. Thus, a heat pump device with a higher efficiency can be obtained. The increase in frequency enables the drive frequency to be set to a high frequency equal to or higher than 16 kHz, which is within the human audible range; therefore, there is an advantage in that it is easy to take measures against noise. Moreover, when SiC is used, a very large current can be caused to flow with low loss compared with the case of the conventional Si; therefore, it is possible to obtain effects, such as reducing the size of cooling fins. In the present embodiment, an SiC device is explained as an example; however, it will be apparent to those skilled in the art that similar effects are obtained by using wide bandgap semiconductor devices formed from diamond, gallium nitride (GaN), or the like instead of SiC. A wide bandgap semiconductor may be used only for the diode of each switching element included in the inverter. Moreover, part of (at least one of) a plurality of switching elements may be formed from a wide bandgap semiconductor. The effects described above can be obtained even when a wide bandgap semiconductor is used for only part of the elements.

In the first and second embodiments, a case is assumed where IGBTs are mainly used as the switching elements; however, the switching elements are not limited to IGBTs, and it is apparent to those skilled in the art that similar effects are obtained even by using power MOSFETs (Metal-Oxide-Semiconductor Field-Effect Transistors) having a super junction structure or other insulated gate semiconductor devices, or bipolar transistors.

Third Embodiment

A heat pump device in a third embodiment will be explained. In the present embodiment, the operation of an apparatus (such as an air conditioner) that includes the heat pump device explained in the first and second embodiments will be explained.

Figure 12:
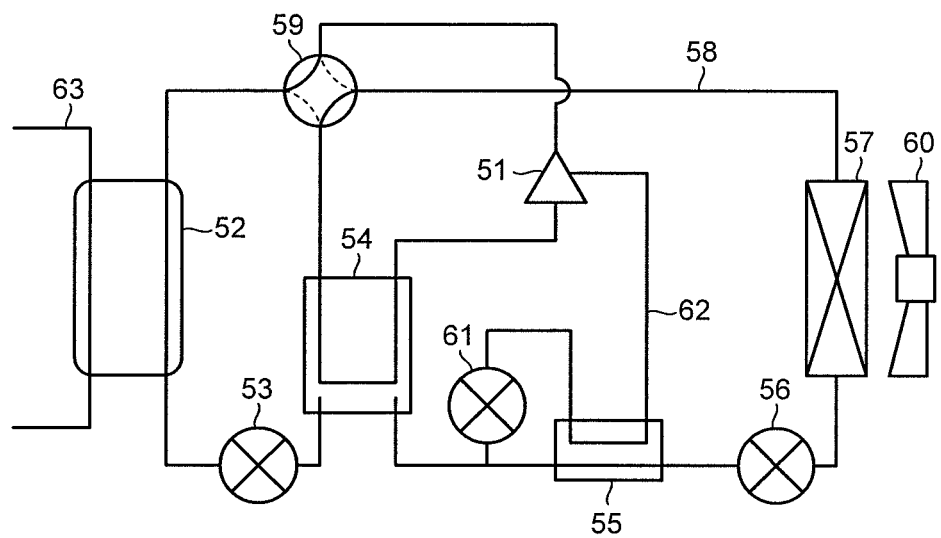
FIG. 12 is a diagram showing a configuration example of a heat pump device in a third embodiment.
Figure 13:
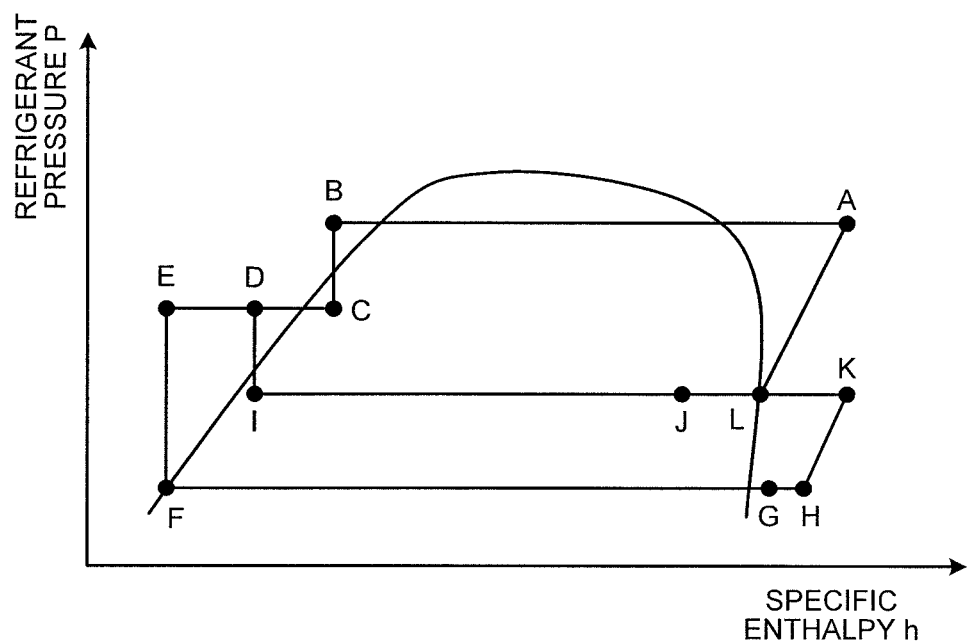
FIG. 13 is a Mollier chart of a state of a refrigerant of the heat pump device.

FIG. 12 is a diagram showing a configuration example of the heat pump device in the third embodiment. FIG. 13 is a Mollier diagram of the state of the refrigerant of the heat pump device shown in FIG. 12. In FIG. 13, the horizontal axis indicates the specific enthalpy and the vertical axis indicates the refrigerant pressure.

In the heat pump device in the present embodiment, a compressor 51, a heat exchanger 52, an expansion mechanism 53, a receiver 54, an internal heat exchanger 55, an expansion mechanism 56, and a heat exchanger 57 are sequentially connected by a pipe, thereby configuring a main refrigerant circuit 58 through which the refrigerant circulates. In the main refrigerant circuit 58, a four-way valve 59 is provided on the discharge side of the compressor 51; therefore, the circulation direction of the refrigerant can be switched. A fan 60 is provided near the heat exchanger 57. The compressor 51 is the compressor 1 explained in the first and second embodiments described above and is a compressor that includes the motor 8 driven by the inverter 9 and the compression mechanism 7 (see FIG. 1). Furthermore, the heat pump device includes an injection circuit 62 that connects, by a pipe, from between the receiver 54 and the internal heat exchanger 55 to an injection pipe of the compressor 51. An expansion mechanism 61 and the internal heat exchanger 55 are sequentially connected to the injection circuit 62. A water circuit 63 in which water is circulated is connected to the heat exchanger 52. A device that uses water, such as a hot water dispenser and a radiator, examples of which include a floor heating, is connected to the water circuit 63.

The operation of the heat pump device having the above configuration is explained here. First, an operation during the heating operation is explained. In the heating operation, the four-way valve 59 is set in the direction of the solid line. The heating operation includes not only heating used for air conditioning but also a hot-water supply for applying heat to water to make hot water.

The gas-phase refrigerant (at point A in FIG. 13) that has become a refrigerant having a high temperature and a high pressure in the compressor 51, is discharged from the compressor 51 and exchanges heat in the heat exchanger 52, which functions as a condenser and a radiator, to be liquefied (at point B in FIG. 13). At this point, water circulating in the water circuit 63 is heated by the heat radiated from the refrigerant and is used for heating and hot-water supply. The liquid-phase refrigerant liquefied in the heat exchanger 52 is decompressed in the expansion mechanism 53 and enters a gas-liquid two-phase state (at point C in FIG. 13). The refrigerant that has entered a gas-liquid two-phase state in the expansion mechanism 53 exchanges heat with the refrigerant drawn into the compressor 51 by the receiver 54 so as to be cooled and liquefied (at point D in FIG. 13). The liquid-phase refrigerant liquefied in the receiver 54 is divided between the main refrigerant circuit 58 and the injection circuit 62 and flows therein.

The liquid-phase refrigerant flowing in the main refrigerant circuit 58 exchanges heat with the refrigerant flowing in the injection circuit 62 (refrigerant that is decompressed in the expansion mechanism 61 and has entered a gas-liquid two-phase state) in the internal heat exchanger 55 and is further cooled (at point E in FIG. 13). The liquid-phase refrigerant cooled in the internal heat exchanger 55 is decompressed in the expansion mechanism 56 and enters a gas-liquid two-phase state (at point F in FIG. 13). The refrigerant that has entered a gas-liquid two-phase state in the expansion mechanism 56 exchanges heat with the outside air in the heat exchanger 57, which functions as an evaporator, and is heated (at point G in FIG. 13). The refrigerant heated in the heat exchanger 57 is further heated in the receiver 54 (at point H in FIG. 13) and is drawn into the compressor 51.

On the other hand, as described above, the refrigerant flowing in the injection circuit 62 is decompressed in the expansion mechanism 61 (at point I in FIG. 13) and exchanges heat in the internal heat exchanger 55 (at point J in FIG. 13). The refrigerant (injection refrigerant) that has exchanged heat in the internal heat exchanger 55 and is in the gas-liquid two-phase state flows into the compressor 51 from the injection pipe of the compressor 51 while remaining in the gas-liquid two-phase state.

In the compressor 51, the refrigerant drawn in from the main refrigerant circuit 58 (at point H in FIG. 13) is compressed to an intermediate pressure and heated (at point K in FIG. 13). The injection refrigerant (at point J in FIG. 13) joins the refrigerant compressed to the intermediate pressure and heated (at point K in FIG. 13), thereby decreasing the temperature (at point L in FIG. 13). The refrigerant having the decreased temperature (at point L in FIG. 13) is further compressed and heated to have a high temperature and a high pressure, and is discharged (at point A in FIG. 13).

When the injection operation is not performed, the aperture of the expansion mechanism 61 is fully closed. In other words, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51. The aperture of the expansion mechanism 61 is electronically controlled by using a microcomputer or the like.

The operation of the heat pump device 100 during the cooling operation is explained next. In the cooling operation, the four-way valve 59 is set in the direction indicated by the broken line. The cooling operation includes not only cooling used for air conditioning but also drawing heat from water to make cold water, performing refrigeration, and the like.

The gas-phase refrigerant (at point A in FIG. 13) that has become a refrigerant having a high temperature and a high pressure in the compressor 51 is discharged from the compressor 51, flows to the heat exchanger 57 side through the four-way valve 59, and exchanges heat in the heat exchanger 57, which functions as a condenser and a radiator, to be liquefied (at point B in FIG. 13). The liquid-phase refrigerant liquefied in the heat exchanger 57 is decompressed in the expansion mechanism 56 and enters a gas-liquid two-phase state (at point C in FIG. 13). The refrigerant that has entered a gas-liquid two-phase state in the expansion mechanism 56 exchanges heat with the refrigerant flowing in the injection circuit 62 in the internal heat exchanger 55 and is cooled and liquefied (at point D in FIG. 13). In the internal heat exchanger 55, the refrigerant that has entered a gas-liquid two-phase state in the expansion mechanism 56 exchanges heat with the refrigerant (at point I in FIG. 13) that has entered a gas-liquid two-phase state by decompressing the liquid-phase refrigerant liquefied in the internal heat exchanger 55, in the expansion mechanism 61. The liquid-phase refrigerant (at point D in FIG. 13) exchanged heat in the internal heat exchanger 55 is divided between the main refrigerant circuit 58 and the injection circuit 62 and flows therein.

The liquid-phase refrigerant flowing in the main refrigerant circuit 58 then exchanges heat with the refrigerant drawn into the compressor 51 in the receiver 54 and is further cooled (at point E in FIG. 13). The liquid-phase refrigerant cooled in the receiver 54 is decompressed in the expansion mechanism 53 and enters a gas-liquid two-phase state (at point F in FIG. 13). The refrigerant that has entered a gas-liquid two-phase state in the expansion mechanism 53 exchanges heat in the heat exchanger 52, which functions as an evaporator, and is heated (at point G in FIG. 13). At this point, because the refrigerant absorbs heat, water circulating in the water circuit 63 is cooled and used for cooling and refrigeration. Then, the refrigerant heated in the heat exchanger 52 flows to the receiver 54 through the four-way valve 59 and is further heated in the receiver 54 (at point H in FIG. 13) and drawn into the compressor 51.

On the other hand, the refrigerant flowing in the injection circuit 62 is decompressed in the expansion mechanism 61 (at point I in FIG. 13) as described above, and exchanges heat in the internal heat exchanger 55 (at point J in FIG. 13). The refrigerant (injection refrigerant) that has exchanged heat in the internal heat exchanger 55 and is in a gas-liquid two-phase state flows into the compressor 51 from the injection pipe of the compressor 51 while remaining in the gas-liquid two-phase state. The compression operation in the compressor 51 is the same as that of the heating operation described above.

When the injection operation is not performed, as in the heating operation described above, the aperture of the expansion mechanism 61 is fully closed so as not to result in the refrigerant flowing into the injection pipe of the compressor 51.

In the above explanations, the heat exchanger 52 has been explained as a heat exchanger like a plate type heat exchanger that exchanges heat between the refrigerant and water circulating in the water circuit 63. However, the heat exchanger 52 is not limited thereto and may be other types of heat exchangers that exchange heat between a refrigerant and air. The water circuit 63 may not be a circuit in which water is circulated, but may be a circuit in which a fluid other than water is circulated.

As described above, the heat pump device explained in the first and second embodiments can be used for a heat pump device using an inverter compressor in an air conditioner, a heat pump water heater, a refrigerator, a freezer, and the like.

INDUSTRIAL APPLICABILITY

As explained above, the heat pump device according to the present invention is useful as a heat pump device capable of efficiently solving a refrigerant retention phenomenon.

The invention claimed is:
1. A heat pump device, comprising:
an inverter that applies a desired voltage to a motor that drives a compression mechanism that compresses a refrigerant, the compression mechanism being provided in a compressor; and
an inverter control unit that controls the inverter, wherein when the compressor is heated,
the inverter control unit
applies, to the motor via the inverter, a high-frequency voltage with which the motor is not capable of being rotationally driven,
estimates a magnetic pole position, which indicates a stop position of a rotor of the motor, on a basis of an induced voltage of the motor,
determines a phase of a voltage command on a basis of an estimation result of the magnetic pole position and determines an amplitude of the voltage command corresponding to a required amount of heat, wherein (i) the required amount of heat is prespecified, and (ii) data indicating a relation between the required amount of heat and the amplitude of the voltage command is used for the determination of the amplitude,
generates a drive signal for the inverter according to the phase which is determined and the amplitude which is determined,
energizes, via the inverter, a winding of the motor according to the drive signal in accordance with the required amount of heat which is prespecified, and
calculates a heat output based on an input/output current and voltage of the motor and, when the calculated heat output is smaller than a predetermined threshold of heat output for high power operation, controls the phase of the voltage command so that the heat output is maximized.

2. The heat pump device according to claim 1, wherein after the phase is determined on a basis of the estimation result, the inverter control unit checks whether the required amount of heat is obtained when control is performed according to determined phase, and
when the required amount of heat is not obtained, determines the phase again such that the required amount of heat is obtained and determines the amplitude on a basis of the required amount of heat.

3. The heat pump device according to claim 1, wherein the inverter control unit determines the amplitude and the phase such that an amount of heat generation specified by a user is obtained.

4. The heat pump device according to claim 3, wherein the inverter control unit prestores a correspondence table between an amount of heat generation capable of being specified by a user, the amplitude, and the magnetic pole position and, when an amount of heat generation is specified by a user, selects an amplitude corresponding to the magnetic pole position at that point and the specified amount of heat generation.

5. The heat pump device according to claim 1, wherein the inverter control unit estimates and prestores the magnetic pole position immediately before the rotor of the motor stops, and
when the compressor is heated, the inverter control unit determines the amplitude and the phase by using the magnetic pole position stored in the inverter control unit.

6. The heat pump device according to claim 1, wherein when the compressor is heated, the frequency of the high-frequency voltage to be applied to the motor by the inverter is set to a frequency that is higher than an upper limit of a human audible frequency range.

7. The heat pump device according to claim 1, wherein when the compressor is heated, the inverter control unit changes the phase by a half cycle in synchronization with a top or a bottom or a top and a bottom of a carrier signal that is used when the drive signal is generated.

8. The heat pump device according to claim 1, wherein at least one of switching elements that constitute the inverter is made from a wide bandgap semiconductor.

9. The heat pump device according to claim 8, wherein the wide bandgap semiconductor is silicon carbide, a gallium nitride material, or diamond.

10. The heat pump device according to claim 1, wherein a diode of a switching element that constitutes the inverter is made from a wide bandgap semiconductor.

11. The heat pump device according to claim 10, wherein the wide bandgap semiconductor is silicon carbide, a gallium nitride material, or diamond.

12. An air conditioner that comprises the heat pump device according to claim 1.

13. A freezer that comprises the heat pump device according to claim 1.

* * * * *